May 19, 1936.  C. G. OLSON  2,041,568
LOCK WASHER
Filed Jan. 31, 1929
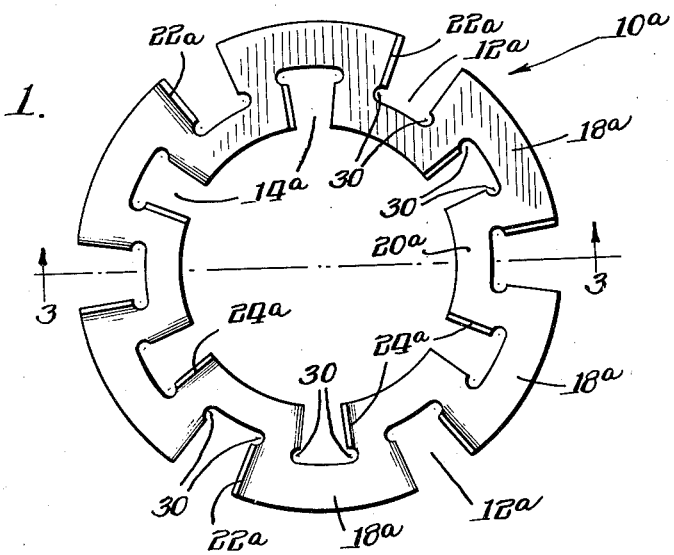
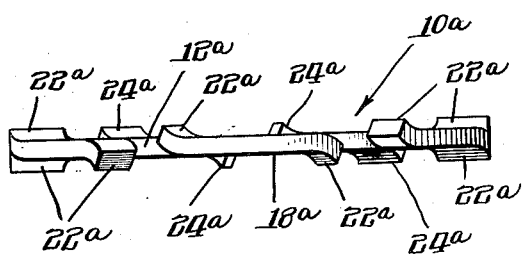
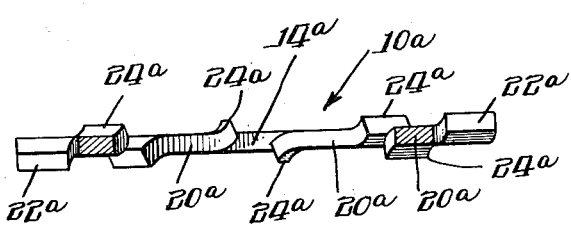
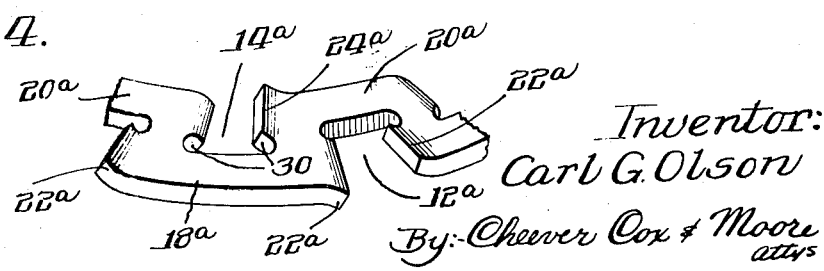
Inventor:
Carl G. Olson
By: Cheever Cox & Moore
attys Patented May 19, 1936

2,041,568

UNITED STATES PATENT OFFICE 2,041,568

LOCK WASHER

Carl G. Olson, Chicago, Ill., assignor, by mesne assignments, to Illinois Tool Works, Chicago, Ill., a corporation of Illinois Application January 31, 1929, Serial No. 336,437

5 Claims. (Cl. 151—35)

My invention relates generally to lock washers, and particularly to lock washers having radial teeth.

It is an object of my invention to provide an improved lock washer having a plurality of teeth presenting extending radial locking edges arranged in such a manner as to employ substantially all of the available stock for locking said teeth in the work.

Another and more specific object of my present invention is to secure increased locking effectiveness of the washer by configurating the stock thereof in zigzag fashion, thereby positioning the cut out sections or notches on one of the margins between the notches on the other margin.

Still more specifically my invention contemplates, in addition to the arrangement of the marginal notches in the manner set forth above, the provision of independently operable work engaging teeth at the extremities of each portion of stock extending between said notches, said teeth being formed by twisting or bending said extremities out of the plane of the washer, whereby the washer when clamped in response to the tightening of a nut will positively interlock with the work, so as to effectively secure the nut against unscrewing.

The above mentioned and other objects will be more apparent from the following detailed description when considered in connection with the accompanying drawing, wherein:

Figure 1 is a plan view of a lock washer, which is a representative embodiment of my invention;

Figure 2 is an elevational view of said washer.

Figure 3 is a transverse sectional view of the washer taken substantially along the line 3—3 of Figure 1;

Figure 4 is a fragmentary perspective view of a section of the washer shown in Figures 1 to 3 inclusive, said view being shown to more clearly illustrate the structural characteristics of the washer.

In Figures 1 to 4 inclusive, I have shown a modified or alternative form of washer, which I have indicated generally by the numeral 10a. This washer is provided with outer cut outs or notches 12a and inner notches 14a. The sections extending between the notches 12a are indicated by the numeral 18a, and the sections extending between the notches 14a are designated by the numeral 20a. The bottom portions of these notches 12a and 14a are relieved at 30 to enable the washer stock adjacent or bordering said notches, to be bent or warped out of the plane of the washer, so as to present work engaging teeth 22a and 24a. It will be noted that these teeth 22a and 24a have work engaging edges rather than sharp corners, and these work engaging edges are positioned in a plane, which is spaced from and in substantial parallelism with the plane of the washer. Thus a tooth edge rather than a tooth corner is adapted to lockingly engage the work when the washer 10a is clamped therebetween. The sections 18a and 20a, provide the necessary resiliency and rigidity to render the teeth 22a and 24a particularly adaptable to be used for their intended purpose, namely, for securing parts, such as threaded nuts and the like against rotation.

From the foregoing it will be apparent that my invention contemplates the provision of a lock washer of improved practical construction in which substantially all of the stock along the inner and outer margins thereof is used for locking purposes. To accomplish this I have configurated the washer body, so as to present a zigzag structure having elongated, circumferential, interconnecting sections. By properly proportioning the width and the depth of the notches in accordance with the work for which the washer is to be used, work engaging teeth having sharp corners or edges may be provided along the inner and outer margins of the washer body. It will also be noted that when the work engaging and locking edges are provided, as in the teeth 22a and 24a, these edges extend radially, a distance which is substantially equal to one-half the width of the washer body. In other words, a plurality of work engaging edges is provided in staggered relation along both sides of the washer, each edge extending at least one half of the distance across the width of said surfaces. By employing substantially all of the available stock in the washer body for locking purposes, as described, I am able to supply a lock washer having independently operable work engaging teeth at the extremities of the elongated sections extending in uninterrupted circumferential succession along the washer body. The use of work engaging or locking teeth of the type described, along both the inner and outer margins is particularly advantageous in instances where the surfaces to be secured are uneven and it is desirable to insure contact of a washer with such uneven surfaces. Lock washers of the type described may be stamped from sheet metal or may be formed from a substantially rectangular narrow strip, the ends of which may be joined together, and the extremities of the notch connecting sections twisted out of the plane of the washer, as and for the purpose already set forth.

Having thus described my invention what I claim as new and desire to secure by Letters Patent is:

1. A lock washer consisting of an annular disc of spring metal having a series of radial notches formed alternately along its inner and outer peripheries, each of which has a circumferential width at its base as great as the radial width of the segment of the disc at the base of the notch, and substantially rigid teeth along the radial margins of the notches projecting alternately in opposite directions from the surfaces of the disc and having edges extending radially of the washer and lying in planes parallel to the faces of the washer, the body being so notched that the application of pressure to said teeth flexes the material of the body into an undulated form.

2. A lock washer consisting of an annular disc of spring metal having a series of radial notches, each of which has a circumferential width at its base as great as the radial width of the segment of the disc at the base of the notch, and substantially rigid teeth along the radial margins of the notches projecting alternately in opposite directions from the surfaces of the disc and having edges extending radially of the washer and lying in planes parallel to the faces of the washer, the body being so notched that the application of pressure to said teeth flexes the material of the body into an undulated form.

3. A lock washer consisting of an annular disc of spring metal having a series of radial notches, each of which has a circumferential width at its base as great as the radial width of the segment of the disc at the base of the notch, marginal portions of the metal along the radial margins of each notch of a width substantially equal to the thickness of the disc being turned in opposite directions at angles of more than 30 degrees to the plane of the disc to provide substantially rigid teeth having projecting right-angled edges extending radially of the disc and lying in planes parallel to the faces of the disc, the body being so notched that the application of pressure to said teeth flexes the material of the body into an undulated form.

4. A lock washer consisting of an annular disc of spring metal having a series of radial notches, each of which has a circumferential width at its base as great as the radial width of the segment of the disc at the base of the notch, and substantially rigid teeth along the radial margins of the notches projecting alternately in opposite directions from the surfaces of the disc and having edges extending radially of the washer and lying in planes parallel to the faces of the washer, each radial notch including at its base circumferentially extending slit portions, the body being so notched that the application of pressure to said teeth flexes the material of the body into an undulated form.

5. A lock washer consisting of an annular disc of spring metal having a series of radial notches with the marginal portions of the metal along opposite radial margins of each notch turned outwardly in opposite directions to present projecting edges extending radially of the washer and lying in planes parallel to the faces of the washer, the dimensions of said outwardly turned marginal portions and the width of said notches bearing such relation to the dimensions of the segments of the disc at the bases of the notches that, upon application of pressure to the washer, said segments will flex before said outwardly turned portions are bent and thereby resiliently cooperate in maintaining said projecting edges in locking engagement with the work clamped thereagainst.

CARL G. OLSON.